US008953471B2

(12) United States Patent
Boland et al.

(10) Patent No.: US 8,953,471 B2
(45) Date of Patent: Feb. 10, 2015

(54) COUNTERACTING SPAM IN VOICE OVER INTERNET PROTOCOL TELEPHONY SYSTEMS

(75) Inventors: Kieran Gerard Anthony Boland, Newry (IE); Telemaque Ndizihiwe, Dublin (IE); Stephen Renwick, Dublin (IE); Mark E. Wallace, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 13/344,401

(22) Filed: Jan. 5, 2012

(65) Prior Publication Data
US 2013/0176865 A1 Jul. 11, 2013

(51) Int. Cl.
H04L 12/26 (2006.01)
H04L 29/06 (2006.01)
H04M 3/436 (2006.01)

(52) U.S. Cl.
CPC ......... *H04L 29/06346* (2013.01); *H04M 3/436* (2013.01)
USPC .......................................................... 370/252

(58) Field of Classification Search
CPC ................................................ H04L 29/06346
USPC ................................................ 370/252, 271
See application file for complete search history.

(56) References Cited

U.S. PATENT DOCUMENTS

| 7,307,997 | B2 | 12/2007 | Vinokurov et al. ........... 370/401 |
| 8,089,900 | B2* | 1/2012 | Bozionek ...................... 370/252 |
| 2004/0107235 | A1* | 6/2004 | Koskelainen ................. 709/200 |
| 2005/0193429 | A1* | 9/2005 | Demopoulos et al. .......... 726/23 |
| 2006/0168329 | A1* | 7/2006 | Tan et al. ....................... 709/238 |
| 2007/0041372 | A1 | 2/2007 | Rao et al. ....................... 370/356 |
| 2008/0075258 | A1 | 3/2008 | Liu et al. .................... 379/210.02 |
| 2008/0123823 | A1* | 5/2008 | Pirzada et al. ............. 379/88.11 |
| 2008/0195867 | A1* | 8/2008 | Asokan et al. ................ 713/176 |
| 2008/0196085 | A1* | 8/2008 | Nagoya et al. ..................... 726/3 |
| 2009/0044264 | A1* | 2/2009 | Ramanathan et al. .......... 726/14 |
| 2009/0252029 | A1* | 10/2009 | Daetz et al. .................... 370/216 |

(Continued)

OTHER PUBLICATIONS

J. Quittek, S. Niccolini, S. Tartarelli, and R. Schlegel. 2008. On Spam over Internet Telephony (SPIT) Prevention. Comm. Mag. 46, 8 (Aug. 2008), 80-86.*

(Continued)

*Primary Examiner* — Jeffrey M Rutkowski
(74) *Attorney, Agent, or Firm* — VanLeeuwen & VanLeeuwen; Jeffrey S. LaBaw

(57) ABSTRACT

An approach is provided to detect a spam message transmitted over a packetized, network-based telephony system. A request to initiate a first voice communication session is received from a requestor. A voice communications session is established with the requestor over the computer network. An audible ringing tone is sent to the requestor over the established voice communications session. While the audible ringing tone is being sent, audio data that is received from the requestor is analyzed. If the analysis detects an audible message in the audio data, then the requestor is identified as a possible spam source. On the other hand, if the analysis fails to detect the audible message in the audio data then the established voice communications session is handled as a non-spam event.

5 Claims, 6 Drawing Sheets

(56) References Cited

U.S. PATENT DOCUMENTS

| | | | | |
|---|---|---|---|---|
| 2010/0064362 | A1 | 3/2010 | Materna et al. | 726/15 |
| 2010/0226261 | A1* | 9/2010 | Piche | 370/252 |
| 2010/0329241 | A1 | 12/2010 | Ryou et al. | 370/352 |
| 2011/0211497 | A1* | 9/2011 | Shiga et al. | 370/271 |
| 2011/0265145 | A1* | 10/2011 | Prasad et al. | 726/3 |

OTHER PUBLICATIONS

Quittek, J.; Niccolini, S.; Tartarelli, S.; Stiemerling, M.; Brunner, M.; Ewald, T., "Detecting SPIT Calls by Checking Human Communication Patterns," Communications, 2007. ICC '07. IEEE International Conference on , vol., No., pp. 1979,1984, Jun. 24-28, 2007.*

Dimitris Gritzalis, Yannis Mallios, A SIP-oriented SPIT Management Framework, Computers & Security, vol. 27, Issues 5-6, Oct. 2008, pp. 136-153.*

Bai et al., "Detection and filtering Spam over Internet Telephony—a user-behavior-aware intermediate-network-based approach," IEEE Conference on Multimedia and Expo, Jun. 2009.

MacIntosh et al., "Detection and Mitigation of Spam in IP Telephony Networks using Signaling Protocol Analysis," National Chi Nan University Next Generation Telephony Laboratory, 2007.

Wu et al., "Spam Detection in Voice-over-IP Calls through Semi-Supervised Clustering," Purdue University, Mar. 2009.

"Spider: Spam Over Internet Telephony Detection Service," EU Spider Project, 2006-2007.

Bai et al., "Detection and Filtering Spam over Internet Telephony—A User-behavior-aware Intermediate-network-based Approach," IEEE Conference on Multimedia and Expo (ICME), Jun. 2009, New York, NY, pp. 726-729.

MacIntosh et al., "Detection and Mitigation of Spam in IP Telephony Networks using Signaling Protocol Analysis," 2005 IEEE/Sarnoff Symposium on Advances in Wired and Wireless Communication, Apr. 2005, Princeton, NJ, pp. 49-52.

Wu et al., "Spam Detection in Voice-over-IP Calls through Semi-Supervised Clustering," Purdue University, West Lafayette, IN, Mar. 2009, 13 pages.

"Spider: Spam Over Internet Telephony Detection Service," EU Spider Project, projectspider.org, 2006-2007, 1 page.

* cited by examiner

US 8,953,471 B2

COUNTERACTING SPAM IN VOICE OVER INTERNET PROTOCOL TELEPHONY SYSTEMS

TECHNICAL FIELD

The present disclosure relates to an approach that detects and counteracts spam calls received in Voice over Internet Protocol (VoIP) telephony systems.

BACKGROUND OF THE INVENTION

Spam is the use of electronic messaging systems to send unsolicited bulk messages indiscriminately to end users. Various forms of spam exist including email spam, instant messaging spam, and the like. A relatively new form of spam delivers messages to users of Voice over Internet Protocol (VoIP) telephony systems. This SPam over Internet Telephony (SPIT) is VoIP spam that typically uses the Session Initiation Protocol (SIP). Much like a traditional spam recording played on a traditional telephone system, SPIT initiates calls to VoIP users and, when the call is answered, typically plays a prerecorded spam message intended for the end user to hear. As the name implies, VoIP is a technology that provides for voice communications over Internet Protocol (IP) networks, such as the Internet. The proliferation of high speed network connections and the low relative cost of using VoIP has both increased the quality and the popularity of the technology. The Session Initiation Protocol (SIP) is a signaling protocol that is often used for controlling VoIP sessions. SIP can be used to create, modify, and terminate two-party or multi-party sessions. Spammers increasing use SIP to initiate sessions with VoIP users in order to deliver spam messages. VoIP technology is similarly popular to spammers as it is relatively inexpensive to deliver such spam messages. Because the messages travel over IP networks, rather than traditional telephone systems, the calls are not subject to most, if not all, traditional telephone system costs and fees, such as traditional long distance calling fees.

SUMMARY

An approach is provided to detect a spam message transmitted over a packetized, network-based telephony system. A request to initiate a first voice communication session is received from a requestor. A voice communications session is established with the requestor over the computer network. An audible ringing tone is sent to the requestor over the established voice communications session. While the audible ringing tone is being sent, audio data that is received from the requestor is analyzed. If the analysis detects an audible message in the audio data, then the requestor is identified as a possible spam source. On the other hand, if the analysis fails to detect the audible message in the audio data then the established voice communications session is handled as a non-spam event.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
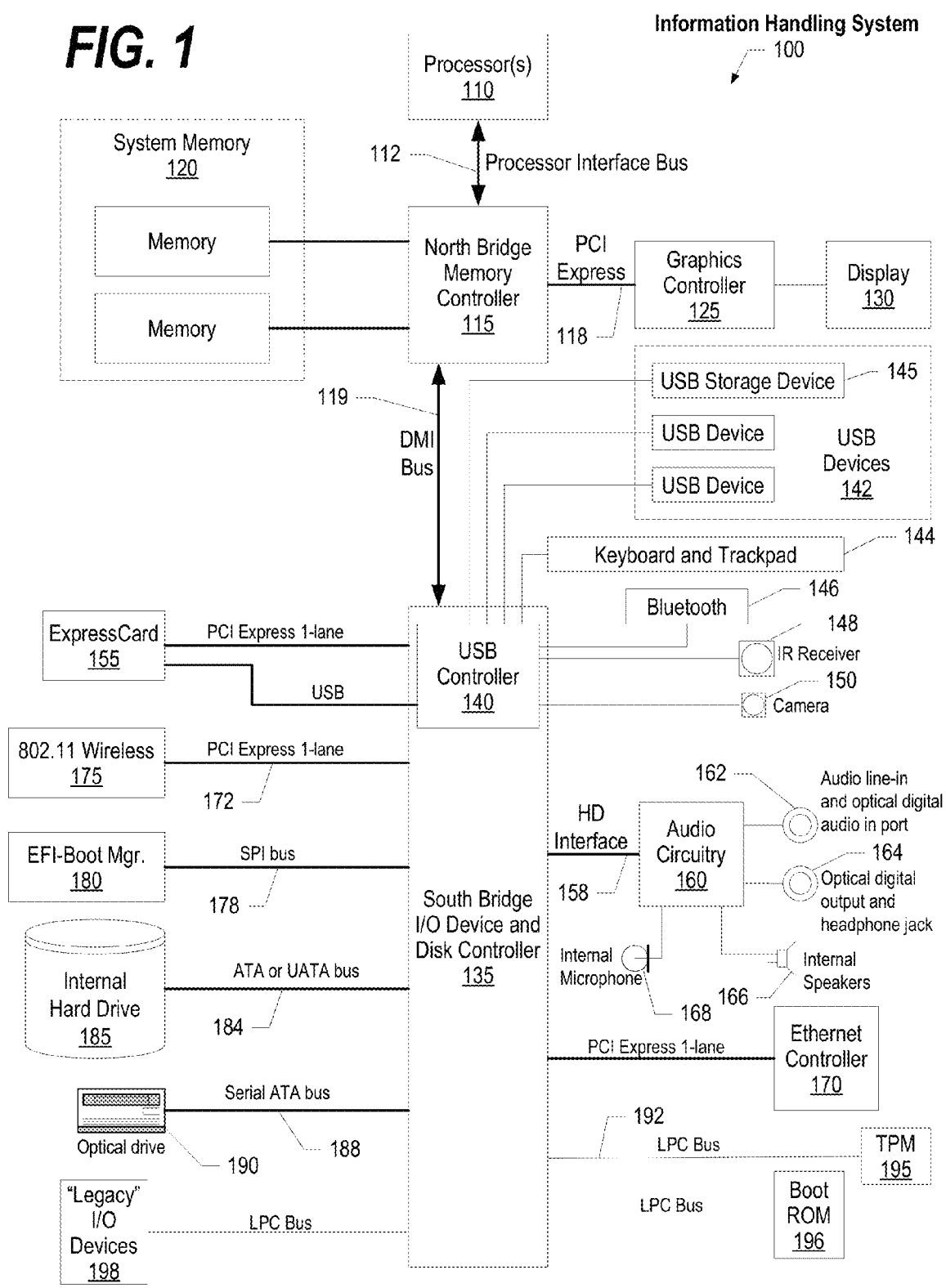
FIG. 1 is a block diagram of a data processing system in which the methods described herein can be implemented.
Figure 2:
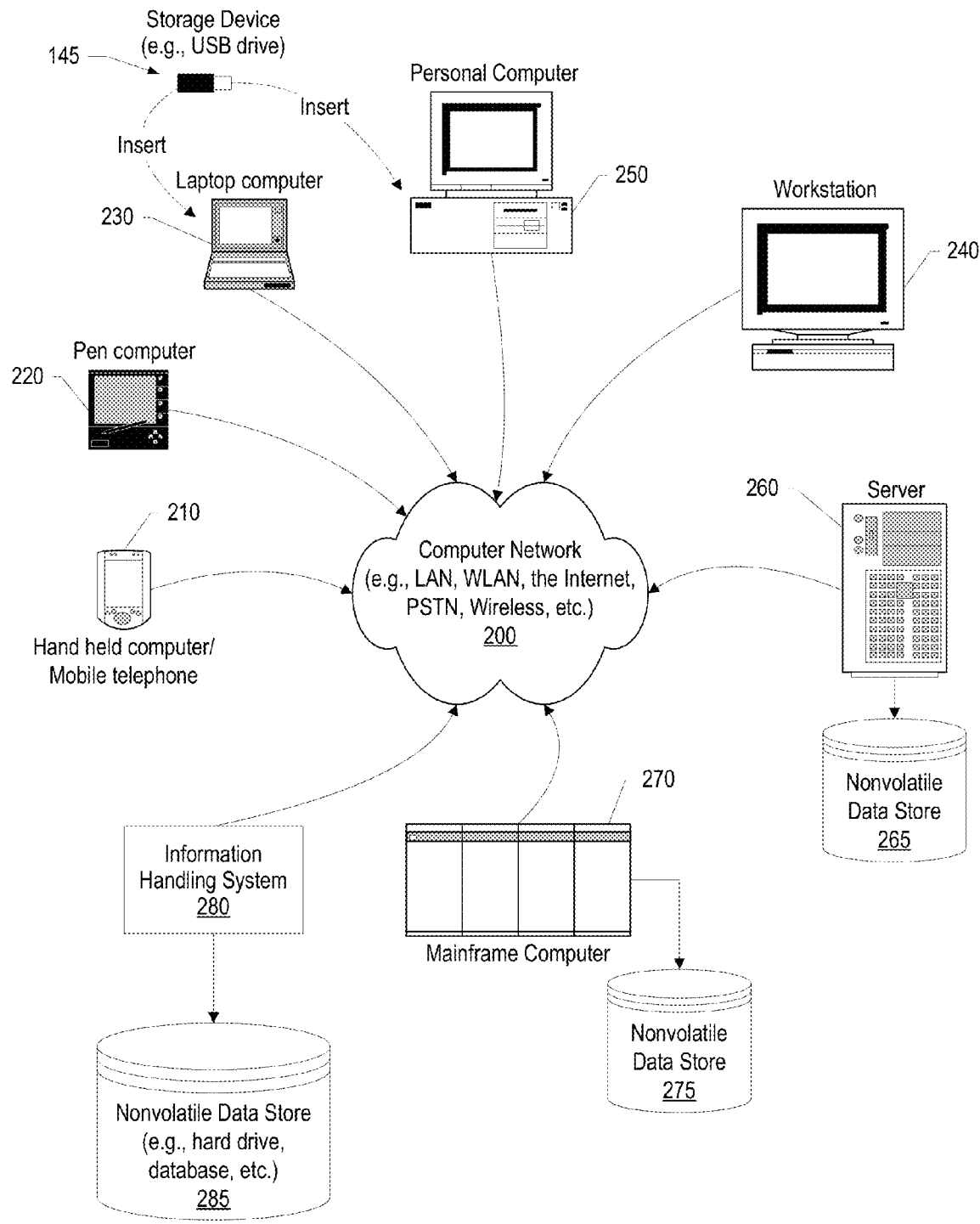
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
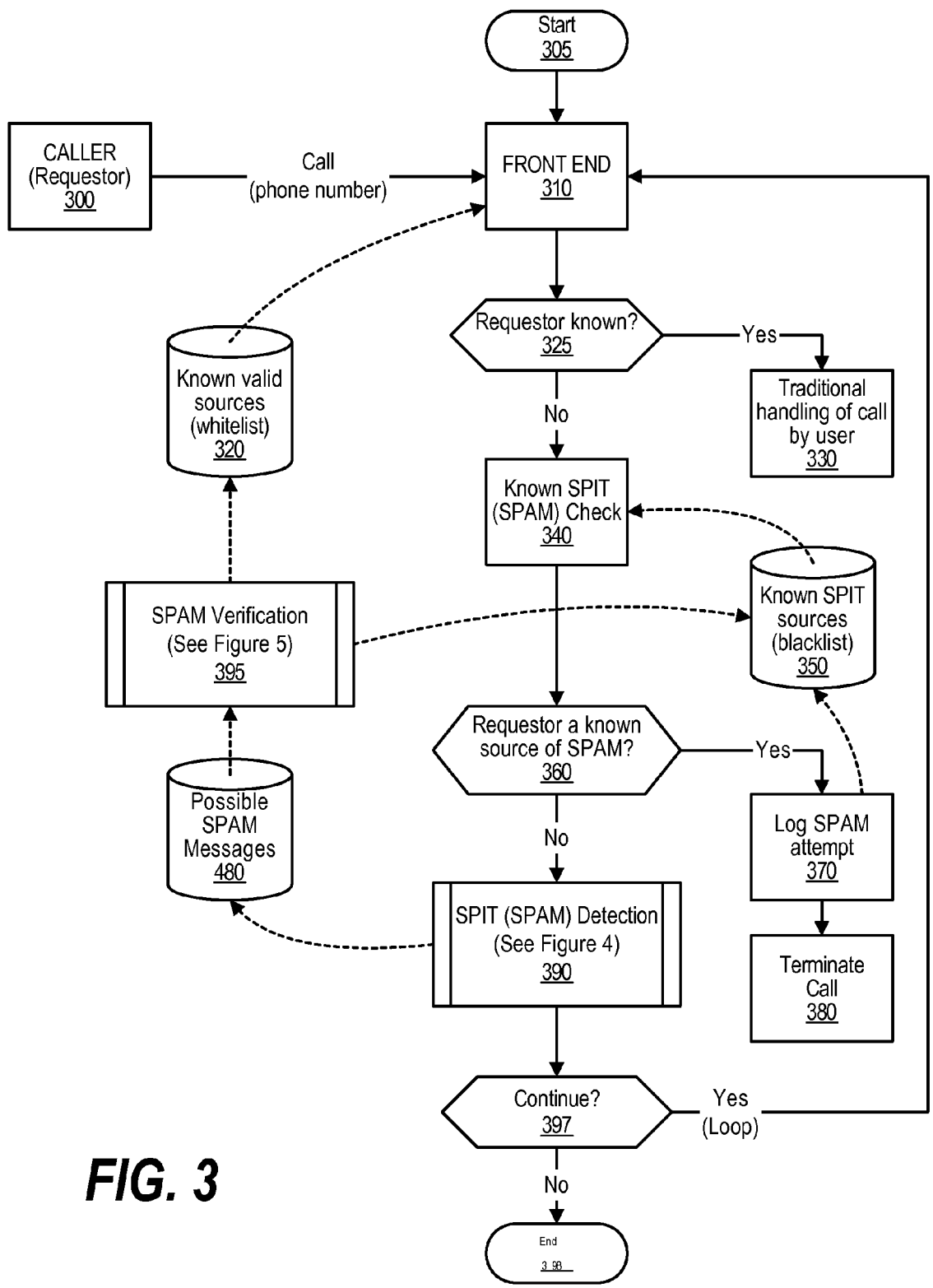
FIG. 3 is a diagram showing front end processing of an incoming call in a Voice over Internet Protocol (VoIP) system that detects spam.

FIG. 3 is a diagram showing front end processing of an incoming call in a Voice over Internet Protocol (VoIP) system that detects spam. Caller 300 is a requestor of a voice communications session with a user's system and initiates contact by sending an initiation message to the user's system which invites the user's system to establish the session. The initiation message and subsequent messages between the requestor and the user's system are transmitted over a computer network, such as the Internet (see, e.g., computer network 200 in FIG. 2). Data travels over the computer network in packets. So, when used for voice communications, the vocal signals are digitized and transmitted over the packetized, network-based telephony system. Once arriving at their destination, the digitized vocal signals are converted back to analog vocal signals that are audible when played over a speaker connected to the user's computer system. In one embodiment, the requestor has a requestor identifier, such as a telephone number, which is also transmitted to the user's system.

Processing commences at 305, whereupon front end processing 310 operates on the user's system and receives the initiation message from the requestor 300. Front end processing 310 checks whitelist data store 320 which is a list of known valid requestors and includes requestor identifiers (e.g., telephone numbers, etc.) corresponding to requestors known to the user (e.g., co-workers, family, friends, etc.). A decision is made as to whether the requestor is known to the user as evidenced by the identifier that corresponds to this requestor being included in whitelist data store 320 (decision 325). If the requestor is known to the user, then decision 325 branches to the "yes" branch whereupon, at step 330, the incoming call is handled in the traditional manner by the user (e.g., audibly rings user's phone, user answers call or call directed to voicemail, etc.).

On the other hand, if the requestor is not known to the user (e.g., the requestor's identifier is not included in whitelist data store 320), then decision 325 branches to the "no" branch for further processing. At step 340, a check is made to determine whether the requestor is a previously identified (known) source of SPam over Internet Telephony (SPIT) by comparing the requestor identifier with requestor identifiers stored in blacklist data store 350. A decision is made as to whether the requestor is a known source of spam as evidenced by the requestor's identifier being included in blacklist data store 350 (decision 360). If the requestor is a known source of spam, then decision 360 branches to the "yes" branch whereupon, at step 370, the spam attempt by the requestor is logged (e.g., in blacklist data store 350 or another data store, etc.) and, at step 380, the user terminates the voice communications session (e.g., rejects the requestor's invitation to establish a voice communication session, etc.).

On the other hand, if the requestor is not included in either the whitelist or the blacklist, then decision 360 branches to the "no" branch in order to detect whether the current request is from a spam source (predefined process 390). When processing determines that the request may be from a SPAM source in response to receiving an audible message during a time at which processing provides a ringing tone, processing stores the audible message in possible SPAM messages 480. See FIG. 4 and corresponding text for processing details describing the detection of possible spam events. In turn, processing analyzes the audible message and adds a requestor identifier (e.g., phone number) to the whitelist or the blacklist based upon the analysis (see FIG. 5 and corresponding text for further details). If processing should continue to analyze incoming calls, decision 397 branches to the "Yes" branch, which loops back to receive and analyze subsequent calls. This looping continues until processing terminates, at which point decision 397 branches to the "No" branch and processing ends at 398.

Figure 4:
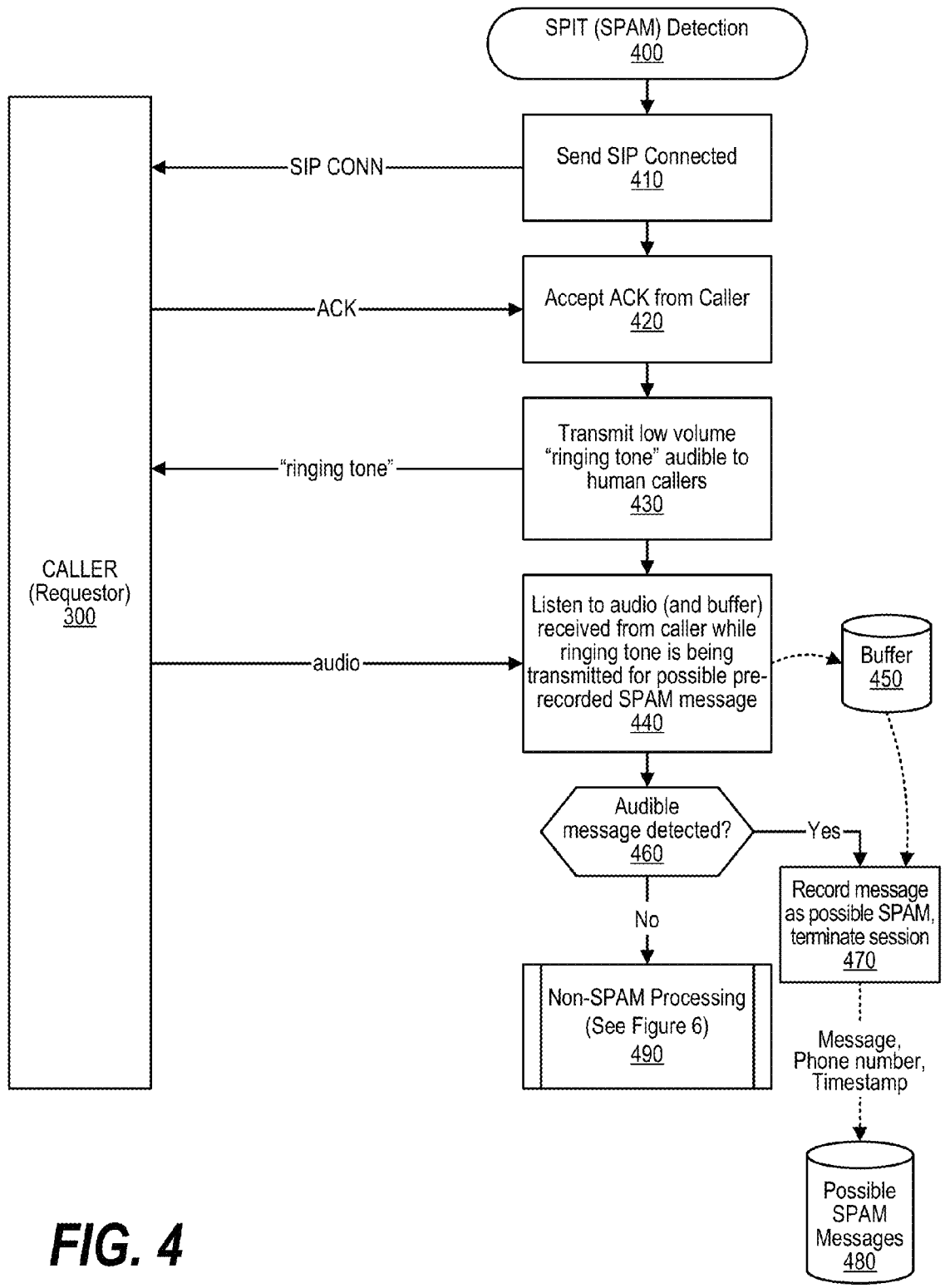
FIG. 4 is a flowchart showing steps performed by the spam detection routine to detect reception of a possible spam message.

FIG. 4 is a flowchart showing steps performed by the spam detection routine to detect reception of a possible spam message. SPam over Internet Protocol (SPIT) detection processing commences at 400. At step 410, the user's system sends a Session Initiation Protocol (SIP) connection message to the requestor over the computer network (e.g., the Internet). At step 420, the user's system receives, and accepts, an acknowledgement (ACK) message from the requestor which establishes the voice communications session over the computer network (e.g., a Voice over Internet Protocol (VoIP) session, etc.).

Once the voice communications session is established, at step 430, a low volume "ringing tone" which is audible to human callers is transmitted from the user's system back to the requestor. If the caller (requestor) is a human, rather than a computerized spambot, the caller will hear the ringing tone and wait for someone at the user's computer system to answer the phone. However, in the case where the caller (requestor) is a computerized spambot, once the voice communications session is established, the spambot will commence playing the recorded spam message since the establishment of the voice communications session traditionally signifies that a user has answered the network-based telephone.

At step 430, the user's computer system listens to audio being received from the caller (requestor) and buffers the received audio in buffer 450. The listening step occurs while the low volume ringing tone is being transmitted by the user's system. As described above, if the caller (requestor) is a spam source, such as a computerized spambot, the spam source will generally start playing the spam message shortly after the voice communications session has been established. The system analyzes the audio data received from the requestor while the audible low volume ringing tone was being sent.

A decision is made as to whether the analysis revealed an audible message being detected in the audio data received from the requestor (decision 460). If an audible message was detected, then decision 460 branches to the "yes" branch whereupon, at step 470, the requestor (requestor identifier) is identified as a possible spam source and the requestor identifier is stored in possible spam message data store 480. Along with the requestor identifier (e.g., the caller's phone number, etc.), the message that was received (buffered in buffer 450), and the timestamp indicating the time that the message was received are also stored in data store 480. After the possible spam message and its associated data are recorded in data store 480, the user's system terminates the established voice communications session with the requestor.

Returning to decision 460, if an audible message was not detected in the audio data, then decision 460 branches to the "no" branch. At predefined process 490, the incoming call (established voice communications session) is handled as a possible non-spam event (see FIG. 6 and corresponding text for processing details).

Figure 5:
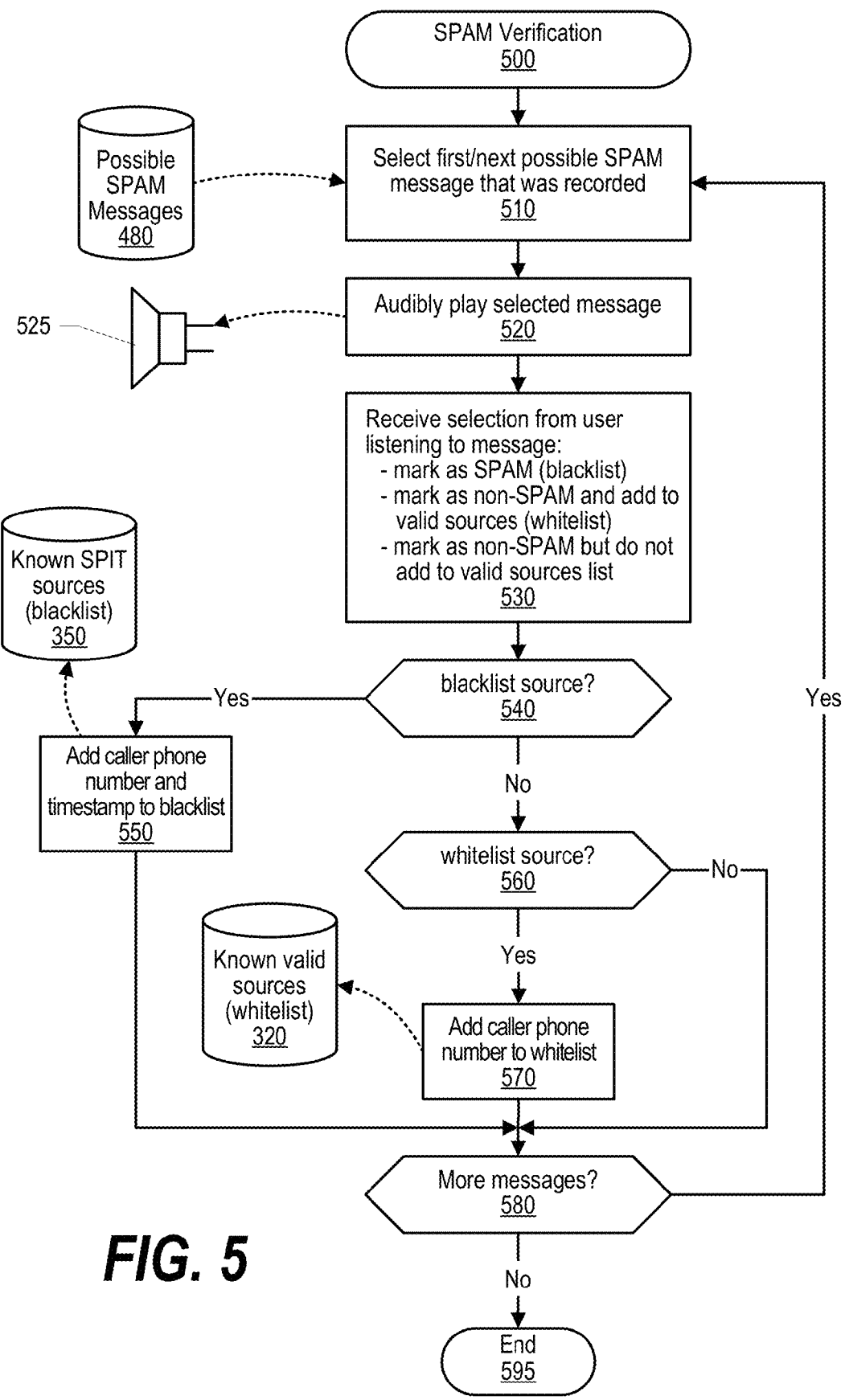
FIG. 5 is a flowchart showing steps performed by a verification process to verify spam messages and add the spam source phone numbers to a black list for future automated blocking.

FIG. 5 is a flowchart showing steps performed by a verification process to verify spam messages and add the spam source phone numbers to a black list for future automated blocking. Spam verification processing commences at 500 whereupon, at step 510, the first potential spam message is selected from possible spam messages data store 480. The possible spam messages were recorded when they were detected as shown in FIG. 4 and as described in corresponding text. At step 520, all or part of the selected message is audibly played to the user over computer speaker 525. Based on hearing the recording, the user is able to determine whether the requestor is a spam source.

At step 530 the user makes a selection regarding the requestor that transmitted the selected message. As shown, the user can mark the message as spam in which case the requestor's identifier will be added to the blacklist. The user can also mark the message as a non-spam message (e.g., a message from a friend, a non-spam computer source such as the user's bank, etc.) and request to add the requestor's identifier to the whitelist as a valid source. In addition, the user can decide to mark the message as being a non-spam message but not to include the requestor's identifier in the user's whitelist.

A decision is made as to whether the user has marked the selected message as a spam message in which case the requestor's identifier should be added to the user's blacklist (decision 540). If the user has decided to blacklist the source of the selected message, then decision 540 branches to the "yes" branch whereupon, at step 550, the requestor identifier (e.g., phone number, etc.) corresponding to the selected message is added to blacklist data store 350. In one embodiment, the timestamp of the message is also added to the blacklist in order to keep track of when the spammer has attempted to contact the user. As previously described, after the requestor's identifier has been added to the blacklist data store, subsequent calls received from the requestor will be automatically terminated without establishing a voice communications session.

Returning to decision 540, if the user did not elect to blacklist the source of the selected message, then decision 540 branches to the "no" branch whereupon a decision is made as to whether the user elected to add the source of the message to the user's whitelist (decision 560). If the user elected to add the source of the message to the user's whitelist, then decision 560 branches to the "yes" branch whereupon, at step 570, the requestor identifier (e.g., phone number, etc.) corresponding to the selected message is added to whitelist data store 320 which contains a list of known, valid sources (e.g., the user's family, friends, co-workers, etc.). As previously shown in FIG. 3 and as described in corresponding text, when an incoming request (call) is received and the requestor identifier is included in whitelist data store 320, then the request is automatically allowed through the system (e.g., rings the user's network telephone, etc.) without further spam detection. If, in step 530, the user chose to mark the message as a non-spam message but decided not to add the requestor identifier to the user's whitelist, then neither blacklist 350 or whitelist 320 are updated.

A decision is made as to whether there are more recorded messages in possible spam messages data store 480 that should be processed (decision 580). If there are more possible messages to process, then decision 580 branches to the "yes" branch which loops back to select and process the next possible spam message as described above. This looping continues until all of the possible spam messages have been processed, at which point decision 580 branches to the "no" branch whereupon spam verification processing ends at 595.

Figure 6:
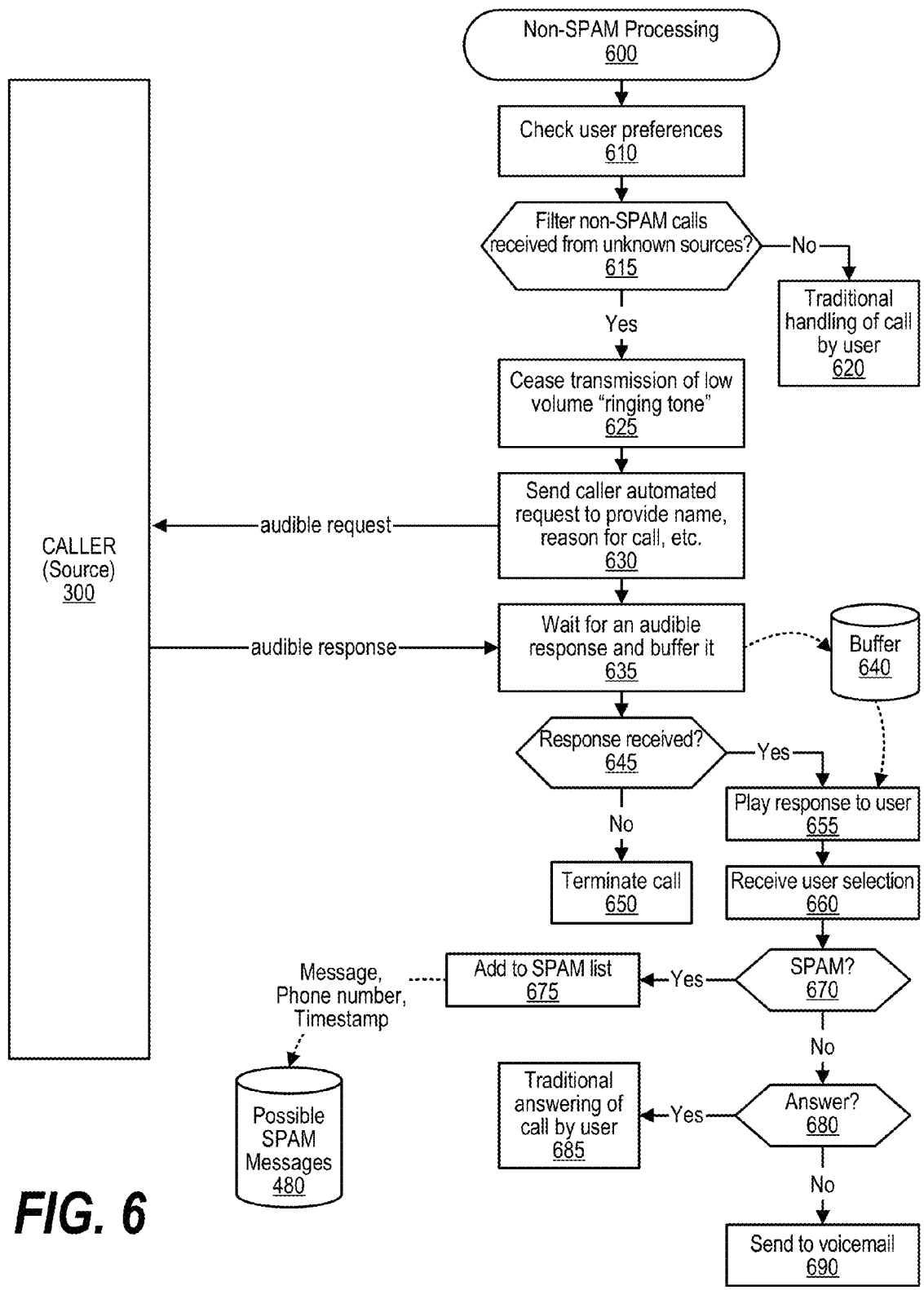
FIG. 6 is a flowchart showing steps performed when a non-spam message is detected from an unknown caller.

FIG. 6 is a flowchart showing steps performed when a non-spam message is detected from an unknown caller. Processing commences at 600 whereupon, at step 610, the system checks user preferences. A decision is made as to whether the user's preferences indicate that the user would like to filter non-spam calls that have been received from unknown sources and not listed in the user's whitelist (decision 615). If the user has indicated that he or she does not wish to filter calls from unknown sources, then decision 615 branches to the "yes" branch whereupon, at step 620, traditional handling of the call is performed (e.g., the user's network-based telephone rings, etc.).

On the other hand, if the user's preferences indicate a preference to filter non-spam calls that are received from unknown sources, then decision 615 branches to the "yes" branch for further processing. At step 625, the transmission of the low volume "ringing tone" being transmitted to the requestor (see FIG. 4) is ceased. At step 630, the user's system transmits an automated request, such as a prerecorded message, asking the caller (the requestor) to provide their name, organization, reason for the call, etc. At step 635, the user's system waits for an audible response to be received from the caller's system (the requestor). The audible response, if received, is stored in buffer data store 640.

A decision is made as to whether the caller provided an audible response to the user's request for the caller's information (decision 645). If the caller (requestor) did not provide a response, then decision 645 branches to the "no" branch whereupon the user's system terminates the call (the voice communications session) with the requestor at 650. On the other hand, if the caller provided a response, then decision 645 branches to the "yes" branch for further processing.

At step 655, the response received from the caller is played to the user over a speaker attached to the user's computer system. Based on the response played to the user, the user provides a selection as to whether the call is spam or other type of unwanted communication, or whether to answer the call or send it directly to voicemail. A decision is made as to whether the call is spam or some other type of unwanted communication (decision 670). If the call is spam or another type of unwanted communication, then decision 670 branches to the "yes" branch whereupon, at step 675, the message and related data (e.g., requestor identifier (phone number), timestamp, etc.) are added to possible spam messages data store 480. On the other hand, if the call is not spam or another type of unwanted communication, then decision 670 branches to the "no" branch whereupon the user makes a determination as to whether to answer the call or send it directly to voicemail (decision 680). If the user decides to answer the call, then decision 680 branches to the "yes" branch whereupon, at step 685, the call is answered by the user using the user's network-based telephone (e.g., speaker, microphone, etc.). On the other hand, if the user decides to send the call to voicemail, then decision 680 branches to the "no" branch whereupon, at step 690, the requestor is instructed to leave a message for the user.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of detecting a spam message transmitted over a packetized, network-based telephony system, the method comprising:
   receiving, over a computer network, a first request to initiate a first voice communication session from a requestor;
   establishing the first voice communications session with the requestor over the computer network;
   sending an audible ringing tone to the requestor over the established first voice communications session;
   analyzing audio data received from the requestor while the audible ringing tone is being sent;
   in response to the analysis detecting an audible message in the audio data:
      playing the audible message to a user; and
      receiving a user selection in response to the playing, wherein a requestor identifier corresponding to the requestor is added to a whitelist in response to the user selection indicating that the audible message is a non-spam message;
   receiving a second request to initiate a second voice communications session from the requestor;
   establishing a second voice communications session with the requestor over the computer network in response to detecting that the requestor identifier is in the whitelist;
   notifying the user of the established second voice communications session with the requestor without the transmission of the audible ringing tone.

2. The method of claim 1 wherein the establishing further comprises:
   transmitting a Session Initiation Protocol (SIP) connection message to the requestor; and
   accepting an acknowledgement (ACK) received from the requestor after the transmission of the SIP connection message, wherein the transmission of the audible ringing tone is sent after the acceptance of the acknowledgement.

3. An information handling system comprising:
   one or more processors;
   a memory coupled to at least one of the processors;
   a network adapter that connects the information handling system to a computer network; and
   a set of instructions stored in the memory and executed by at least one of the, wherein the set of instructions perform actions of:
      receiving, at the network adapter, a first request to initiate a first voice communication session from a requestor;
      establishing the first voice communications session with the requestor over the computer network;
      sending an audible ringing tone to the requestor over the established first voice communications session;
      analyzing audio data received from the requestor while the audible ringing tone is being sent;
      in response to the analysis detecting an audible message in the audio data:
         playing the audible message to a user; and
         receiving a user selection in response to the playing, wherein a requestor identifier corresponding to the requestor is added to a whitelist in response to the user selection indicating that the audible message is a non-spam message;
      receiving a second request to initiate a second voice communications session from the requestor;
      establishing a second voice communications session with the requestor over the computer network in response to detecting that the requestor identifier is in the whitelist; and
      notifying the user of the established second voice communications session with the requestor without the transmission of the audible ringing tone.

4. The information handling system of claim 3 wherein the establishing further comprises:
   transmitting a Session Initiation Protocol (SIP) connection message to the requestor; and
   accepting an acknowledgement (ACK) received from the requestor after the transmission of the SIP connection message, wherein the transmission of the audible ringing tone is sent after the acceptance of the acknowledgement.

5. A computer program product stored in a non-transitory computer readable medium, comprising functional descriptive material that, when executed by an information handling system, causes the information handling system to perform actions that include:
   receiving, over a computer network, a first request to initiate a first voice communication session from a requestor;
   establishing the first voice communications session with the requestor over the computer network;
   sending an audible ringing tone to the requestor over the established first voice communications session;
   analyzing audio data received from the requestor while the audible ringing tone is being sent;
   in response to the analysis detecting an audible message in the audio data:
      playing the audible message to a user; and
      receiving a user selection in response to the playing, wherein a requestor identifier corresponding to the requestor is added to a whitelist in response to the user selection indicating that the audible message is a non-spam message;
   receiving a second request to initiate a second voice communications session from the requestor;
   establishing a second voice communications session with the requestor over the computer network in response to detecting that the requestor identifier is in the whitelist;
   notifying the user of the established second voice communications session with the requestor without the transmission of the audible ringing tone.

* * * * *